United States Patent [19]
Ball

[11] Patent Number: 5,124,617
[45] Date of Patent: Jun. 23, 1992

[54] CHARGE REGULATION CIRCUIT

[75] Inventor: Don G. Ball, Livermore, Calif.

[73] Assignee: The United States of America as represented by the United States Department of Energy, Washington, D.C.

[21] Appl. No.: 689,564

[22] Filed: Apr. 23, 1991

[51] Int. Cl.⁵ ............................................. G05F 1/573
[52] U.S. Cl. ................................... 323/285; 323/286; 361/18; 361/94
[58] Field of Search ................ 323/282, 285, 286, 287, 323/901; 361/18, 87, 93, 94

[56] References Cited

U.S. PATENT DOCUMENTS

| | | | |
|---|---|---|---|
| 4,127,885 | 11/1978 | Adam et al. | 361/18 |
| 4,253,055 | 2/1981 | Gatten | 323/284 |
| 4,357,572 | 11/1982 | Andersen et al. | 323/286 |
| 4,524,412 | 6/1985 | Eng | 323/285 |
| 4,929,882 | 5/1990 | Szepesi | 323/285 |
| 5,001,413 | 3/1991 | Ohms | 323/285 |

Primary Examiner—Peter S. Wong
Attorney, Agent, or Firm—M. A. Valdes; Roger S. Gaither; William R. Moser

[57] ABSTRACT

A charge regulation circuit provides regulation of an unregulated voltage supply in the range of 0.01%. The charge regulation circuit is utilized in a preferred embodiment in providing regulated voltage for controlling the operation of a laser.

8 Claims, 6 Drawing Sheets

CHARGE REGULATION CIRCUIT

FIELD OF THE INVENTION

The United States Government has rights in this invention pursuant to Contract No. W-7405-ENG-48 between the United States Department of Energy and the University of California for operation under Lawrence Livermore National Laboratory.

BACKGROUND OF THE INVENTION

The present invention relates to a charge regulation circuit, and in particular to a charge regulation circuit using an unregulated power supply for charging a capacitor to a desired repeatable voltage.

Charge regulation circuits are known in the prior art for regulating voltages in a wide variety of applications. In one approach, a circuit is provided to charge the capacitor to a voltage greater than the desired voltage, and then to "bleed off" enough charge to obtain the desired voltage.

Another approach using an unregulated voltage is to resonantly charge the capacitor using an LC circuit and then to "deQ" the inductor at precise times and voltages.

A problem with such prior art approaches in utilizing an unregulated power supply is the difficulty in attaining sufficient percentages of regulated voltages for applications such as in a laser environment. If the voltage is not regulated with a sufficient percentage of accuracy, say in the range of 0.01% regulation, the operation of the laser itself can be dramatically affected.

SUMMARY OF THE INVENTION

It is an object of the present invention to provide an improved charge regulation circuit that provides voltage regulation in the range of 0.01% on a capacitor charged from an unregulated power supply.

Briefly, the charge regulation circuit comprises a power supply for supplying unregulated power to a charge circuit, which includes an inductor and a capacitor (LC) in series. The circuit further includes a controllable switch which can be opened or closed at precise times to enable the unregulated power to be applied (or not) to the LC circuit.

The circuit also includes a diode with the LC circuit so that the capacitor charges through the diode when the switch is opened.

Using a precise mathematical algorithm, the charge regulation circuit provides regulation in the range of 0.01%.

Other objects, advantages and novel features of the present invention will be set forth in part in the description which follows, and in part become apparent to those skilled in the art upon examination of the following, or may be learned by practice of the invention. The objects and advantages of the invention may be realized and attained by mean of the instrumentalities and combinations which are pointed out in the appended claims.

BRIEF DESCRIPTION OF THE DRAWINGS

The accompanying drawings, which are incorporated in and form a part of this specification, illustrate an embodiment of the invention and, together with the description, serve to explain the principles of the invention.

DETAILED DESCRIPTION OF THE DRAWINGS

Reference will now be made in detail to a preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
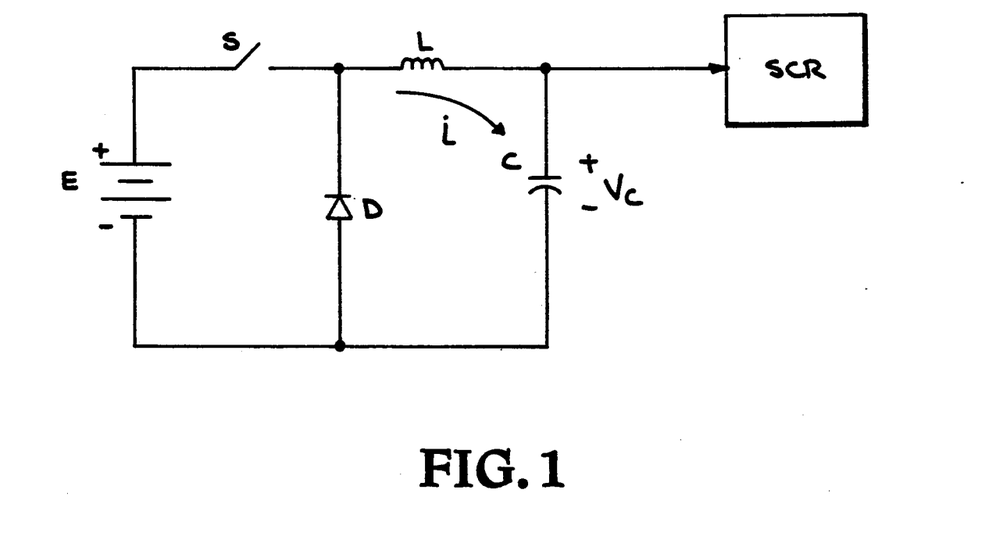
FIG. 1 depicts a schematic diagram of a charge regulation circuit.

Referring to FIG. 1, an unregulated DC power supply E is connected to a switch S which is used to connect E to the rest of the circuit. This circuit is a resonant charge circuit comprising L and C. The capacitor C is charged through the inductor L when switch S is closed. When C reaches a particular voltage (Vc), switch S is opened. When S is opened, current going through inductor L continues to go through the loop charging C through diode D. Diode D blocks any reversal of the charge off C.

In one embodiment, the unregulated voltage E is approximately 600–700 volts. The charge at C is desired to be about 1,000 volts. With normal resonant circuits, a voltage doubling effect takes place. The desired regulation is about 0.01%.

Zero percent regulation is not practically possible because of fundamental problems of the switch S not being ideal. Desirably, the switch S is a gate turnoff thyristor (GTO). The invention can be used in many different applications.

The novelty of the present invention relates to the use of a charge regulation circuit with a novel mathematical algorithm which provides for regulation in the range of approximately 0.01%.

The charge regulation circuit of FIG. 1 assumes that the frequency of operation can be determined by $\omega_o 2 = 1/LC$ and where switch S closes at $t=0$ and S opens at $t=t_1$.

For $0 \leq t < t_1$:

$E = V_c + L\, di/dt$
$V_c(t) = E(1 - \cos \omega_o t)$
$i(t) = E/(\omega_o L) \sin \omega_o t$ For $t_1 \leq t$:

-continued $V_c(t_1) = E(1 - \cos \omega_o t_1)$
$i(t_1) = E/(\omega_o L)\sin \omega_o t_1$
$i(t) = E/(\omega_o L)[\sin \omega_o t_1 \cos \omega_o t - (1 - \cos \omega_o t_1)\sin \omega_o t]$ The final charge voltage is reached at $t=t_z$ when $i(t_z)=0$ and $V(t_z)=V_f$ $$\omega_o t_z = \arctan \frac{\sin \omega_o t_1}{1 - \cos \omega_o t_1}$$

$V_f = 2E \sin(\omega_o t_1/2)$

When E changes to E', it is an objective to find the proper or desired charge voltage (V'$_1$) at which to open the switch so that the final charge voltage (V'$_f$) will equal $V_f$:

$V_c(t_1) = V_1 \quad V_c'(t_1') = V_1'$
$V_f = 2E \sin[1/2 \arccos(1 - V_1/E)]$
$V_f' = 2E' \sin[1/2 \arccos(1 - V_1'/E')]$ $V_f = \sqrt{2E V_1} \quad V_f' = \sqrt{2E' V_1'}$ For
$V_f = V_f': V_1' = V_1 E/E'$ Referring now to FIG. 6, a timing diagram depicting unregulated charge voltage with regulated final charge voltage is shown.

Figure 6:
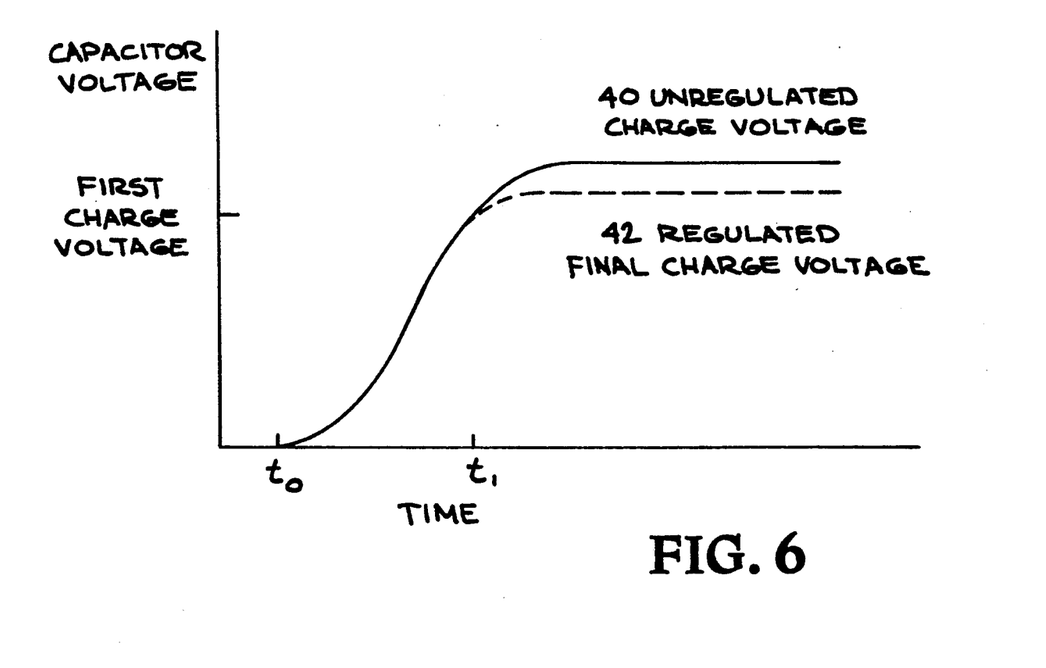
FIG. 6 depicts a timing diagram illustrating the comparison of unregulated charge voltage with regulated final charge voltage.

The diagram of FIG. 6 depicts a single cycle of operation in which at a first time t0, the capacitor C of FIG. 1 is charged until a second time $t_1$, at which time a first charge voltage across capacitor C is reached. At time $t_1$, the switch opens and there is still energy stored in the inductor L to permit capacitor C to charge to the regulated final charge voltage 42, as indicated in FIG. 6. The unregulated charge voltage 40 is also shown in FIG. 6 (if there were no charge regulation circuit). The unregulated charge voltage is an undesirable aspect, as previously described.

Figure 7:
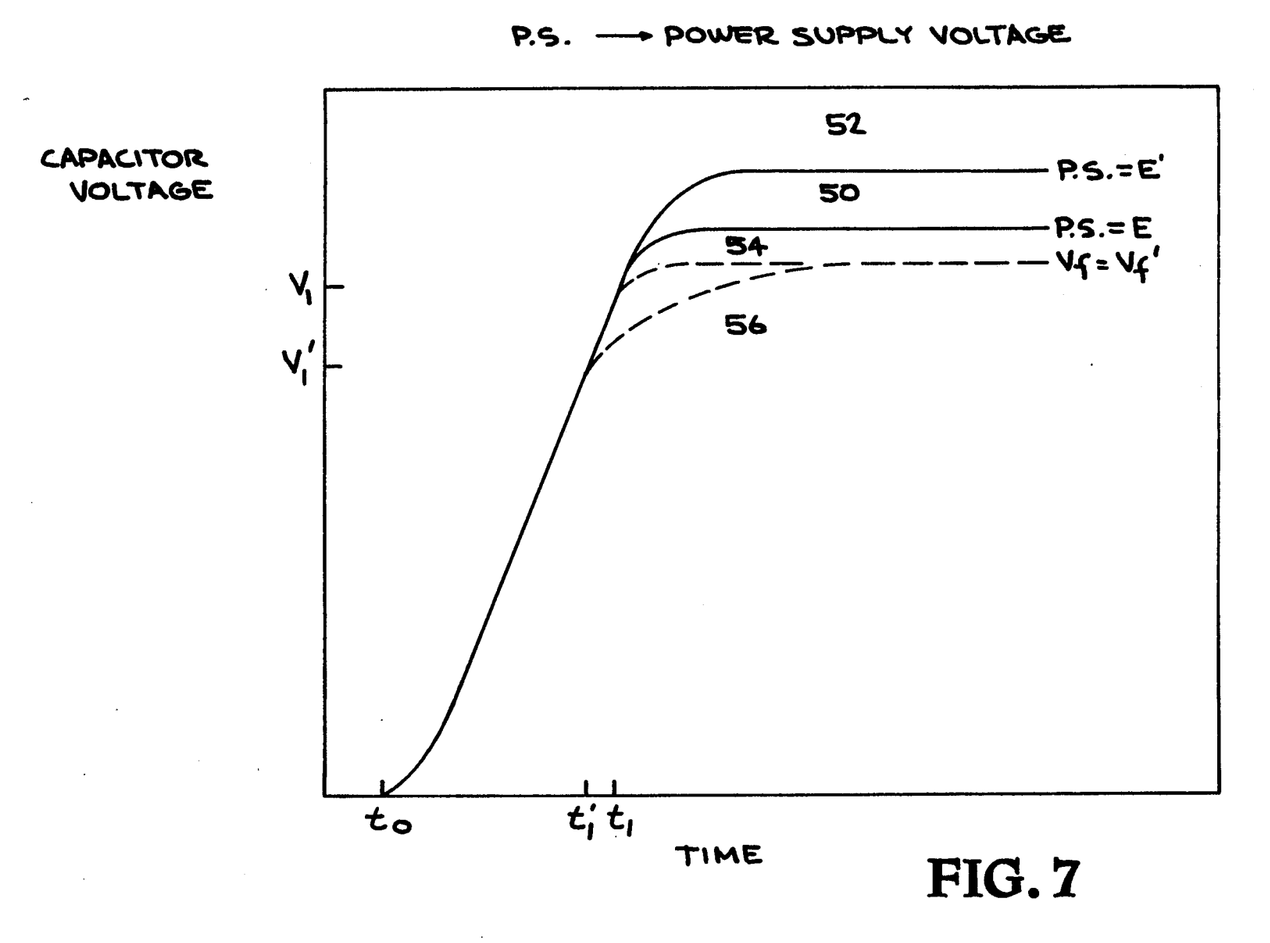
FIG. 7 depicts a timing diagram illustrating the aspects of the present invention.

Referring now to FIG. 7, a depiction of what could occur with two separate pulses (two cycles) applied to the charge regulation circuit according to the present invention is depicted.

In FIG. 7, a first power supply (PS) voltage of value E is applied at a time t0 resulting in the capacitor charge voltage 50. If the next power supply voltage is of value E', then the final capacitor charge voltage 52 will change if there is no regulation.

It is desired that the charge on C be the same value each time a power supply voltage pulse is applied, even if the power supply voltage changes, such as from E to E'.

In FIG. 7, at time t1, the charge voltage is $V_1$ and is indicated as a dotted line 54, which reaches the final voltage $V_f$, as previously described. The first charge voltage $V_1$ is shown in FIG. 7.

On the next pulse the power supply voltage is E'. At time t'$_1$, the charge voltage is $V_1'$ and is indicated as a dotted line 56, which reaches the final voltage $V_f'$, as also previously described. Because there is more energy stored in the second case (because of the larger power supply voltage E'), the voltage $V_1'$ increases to the final charge voltage V'$_f$ (which equals $V_f$).

As seen in FIG. 7, the successive final charge voltages $V_f$ and $V_f'$ are desirably equal to one another to provide proper charge regulation.

Figure 2:
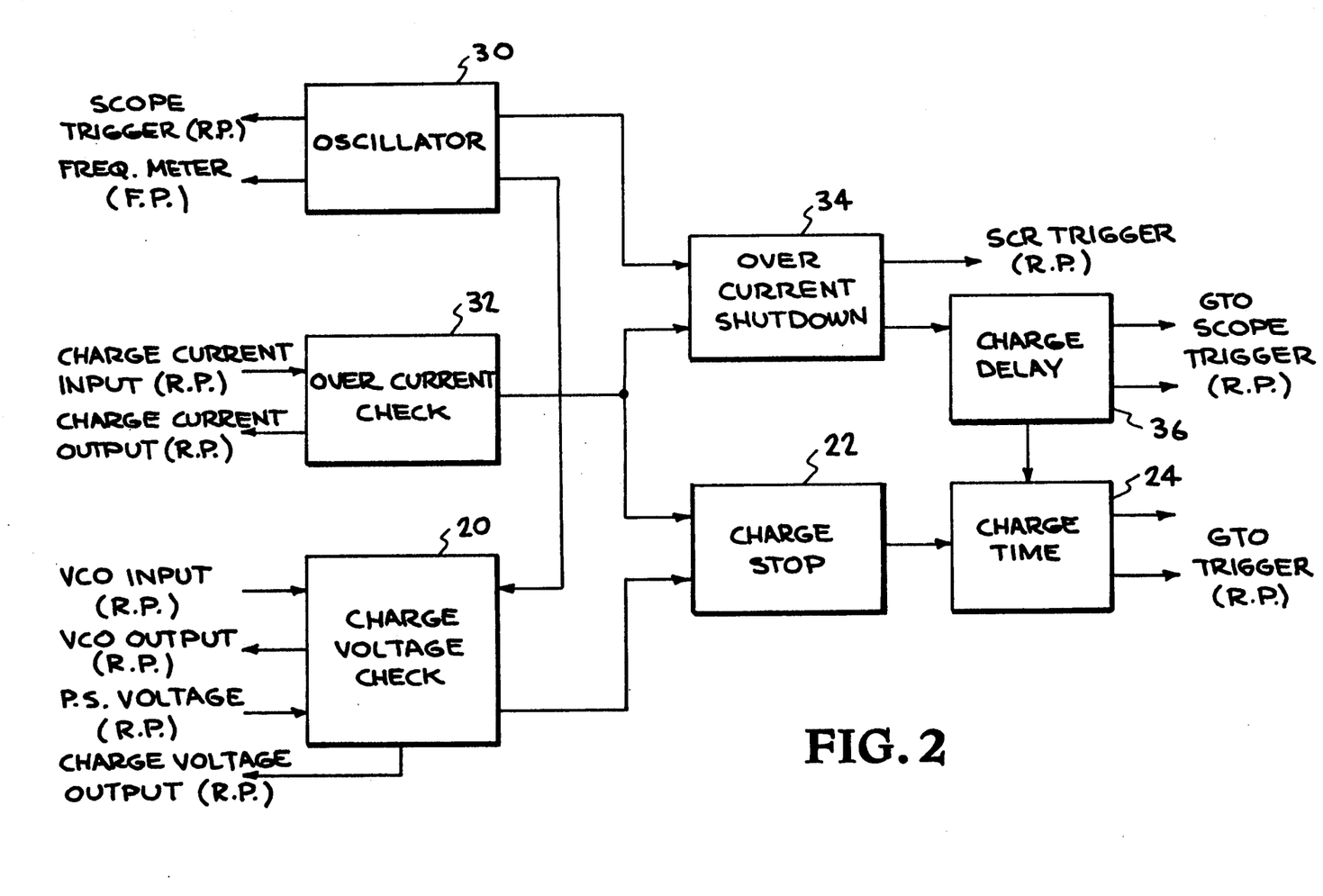
FIG. 2 depicts a block diagram of a control circuit for controlling the operation of the charge regulation circuit of FIG. 1.

Referring now to FIG. 2, a block diagram of a control system incorporating a charge regulation circuit is depicted.

The important circuits in FIG. 2 are the charge voltage check circuit 20, charge stop circuit 22, and charge time circuit 24. FIG. 2 also includes an oscillator 30, an overcurrent check 32, an overcurrent shutdown 34, and a charge delay circuit 36.

The oscillator circuit 30 provides the necessary frequencies for connection to the overcurrent shutdown circuit 34 and the charge voltage check circuit 20. The oscillator 30 provides the necessary timing pulses for operating the other circuits of FIG. 2.

One output from the oscillator 30 is to the overcurrent shutdown 34, which checks the overall system operation and provides the main SCR trigger pulse and provides fault protection for the circuit.

Another output of the overcurrent shutdown 34 goes to the charge delay circuit 36 to provide a delay between the SCR switch of FIG. 1 and the GTO switch.

The charge delay 36 provides necessary delays between the operation of the system controlled by an SCR and that of the charge regulation circuit itself of FIG. 1 (controlled by the GTO).

During the operation of the charge regulation circuit, the charge time circuit 24 receives a signal from the charge delay circuit 36, and in response thereto turns on the GTO of the charge regulation circuit.

The charge voltage check circuit 20 of FIG. 2 receives a VCO input and a power supply (PS) input. This is to provide appropriate voltage checks of the power supply E and the capacitor C of the charge regulation circuit of FIG. 1.

The charge voltage check circuit 20 provides an appropriate input to the charge stop circuit 22 when the voltages reach a suitable or appropriate value.

Figure 3:
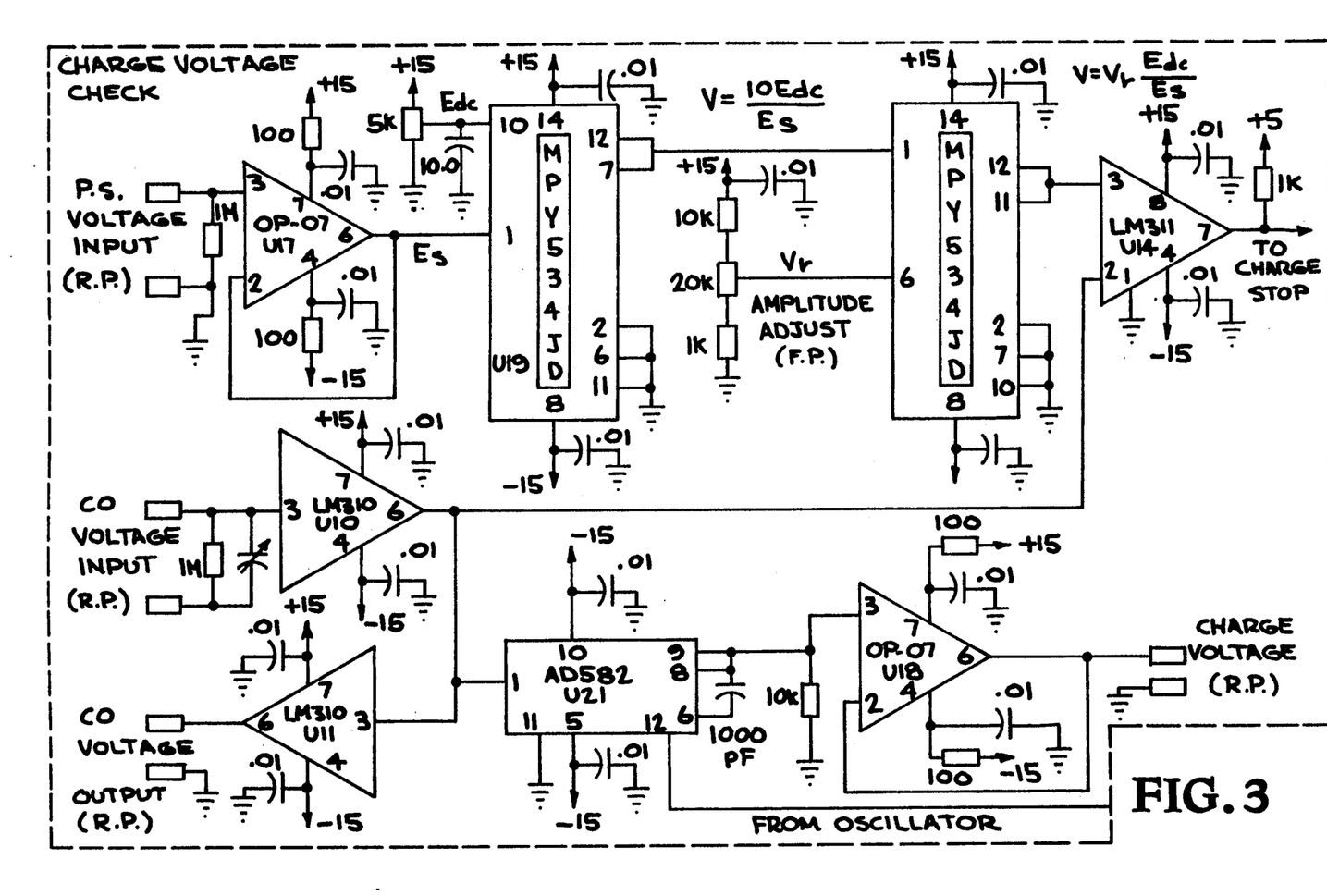
FIG. 3 depicts a schematic diagram of a charge voltage check circuit which forms part of the control system of FIG. 2.

Referring now to FIG. 3, the charge voltage check circuit 20 of FIG. 2 is shown in more detail.

The power supply (PS) voltage is input to amplifier U17 which provides an appropriate voltage signal ES for input to circuit U19, which is a multiplier circuit. Circuit U19 receives a reference voltage EDC together with the ES voltages and provides an output V=10 EDC/ES.

ES in FIG. 3 corresponds to E' in the algorithm set forth above. EDC corresponds to E in the algorithm. $V_R$ corresponds to $V_1$ in the algorithm.

In FIG. 3, $V_R$ is an input together with voltage V into multiplier U20, which provides the output V=$V_R$ EDC/ES (which is the same voltage set forth in the algorithm depicted above.

U14 is a comparator which compares the voltage V with the actual voltage on capacitor C of FIG. 1, which is input as CO to buffer amplifier U10 in FIG. 3.

When the voltage CO is equal to the voltage V, comparator U14 changes state and generates the appropriate signal for connection to the charge stop circuit for turning off the GTO (switch S) of the charge regulation circuit.

Buffer amplifier U11 of FIG. 3 is provided for providing the voltage signal CO to a suitable testing device such as an oscilloscope for diagnostic purposes. U21 of FIG. 3 is a sample and hold circuit for sampling the voltage CO for input to a buffer amplifier U18 for output for connection to a suitable digital voltmeter for monitoring the voltage being checked.

The pulse from the charge voltage check circuit is input to the charge stop circuit, which also receives a signal from the overcurrent check circuit of FIG. 2.

Figure 4:
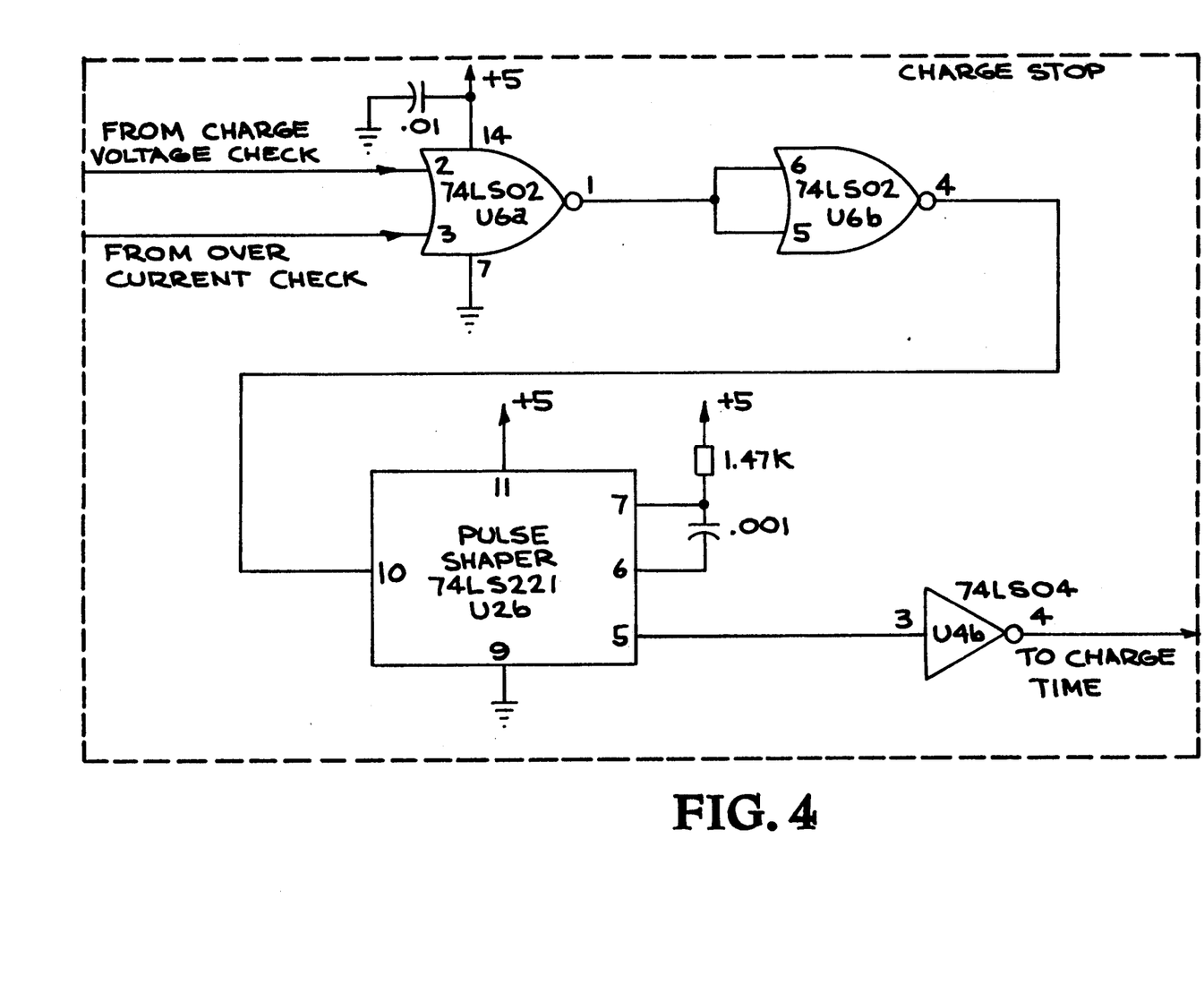
FIG. 4 depicts a schematic diagram of the charge stop circuit which forms a portion of the control circuit of FIG. 2.

If the signals received either from the overcurrent check circuit or the charge voltage check circuit, gates U6A and U6B will provide an appropriate input to pulse shaper circuit U2B (a monostable multivibrator) which provides a pulse shape of a certain width out through gate U4B. The duration of the pulse from U2B is approximately 10 microseconds, in one embodiment.

The output of inverter U4B is a signal connected to the charge time circuit of FIG. 2. The charge time circuit of FIG. 2 is depicted in more detail in FIG. 5.

Figure 5:
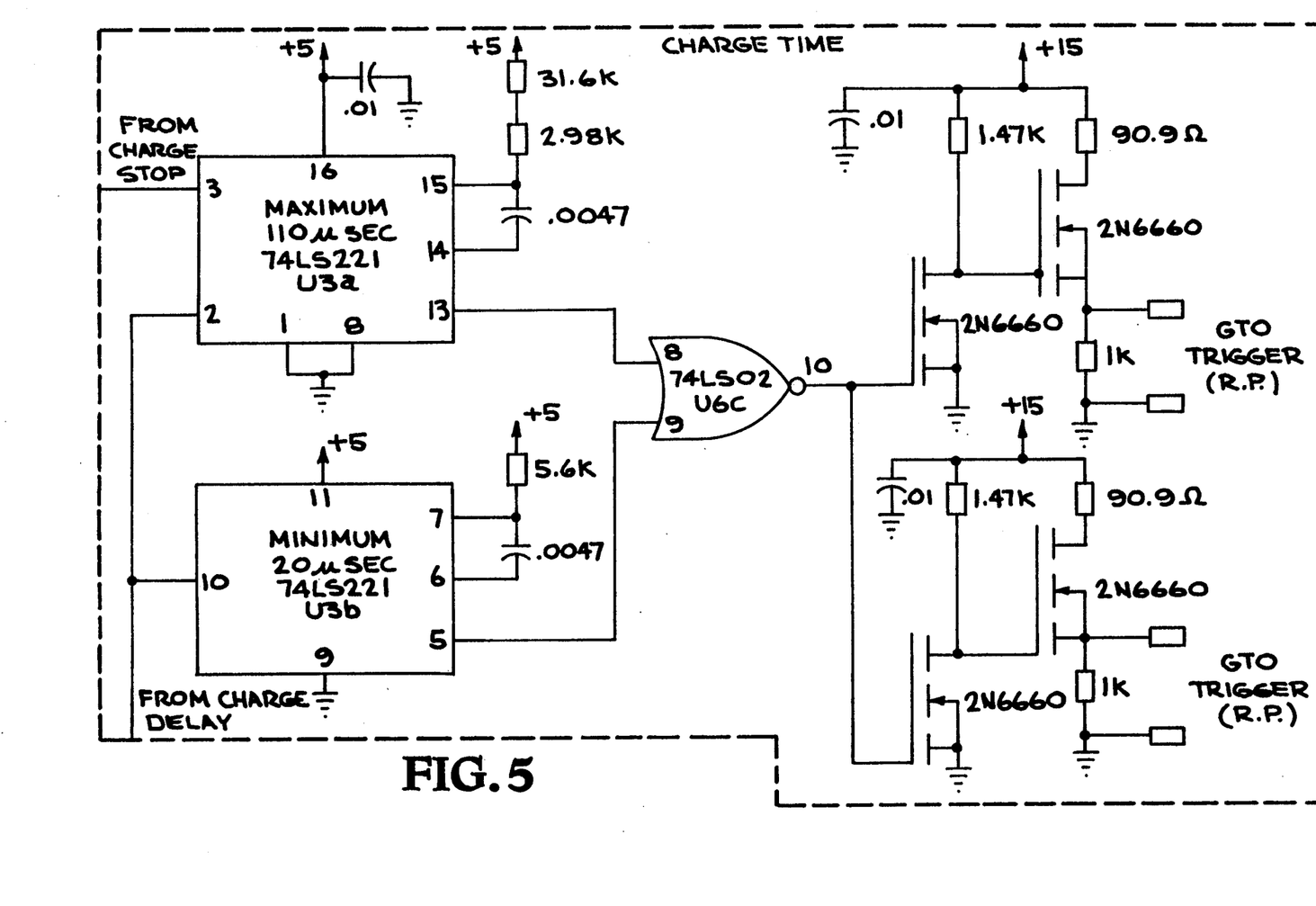
FIG. 5 depicts a schematic diagram of a charge time circuit which forms a portion of the control circuit of FIG. 2.

The charge stop signal will be input to circuit U3A of FIG. 5, which will instruct the GTO to be switched off.

In FIG. 5, the charge stop signal is input to the pulse shaper U3A, which has a pulse of approximately 110 microseconds. The circuit U3A will turn off the GTO even if a charge stop signal is not received from the charge stop circuit.

The output of circuit U3A is input to gate U6C, which also receives an input from another pulse shaper U3B, which has a minimum 20 microsecond pulse signal.

U3B is provided for the charge regulation circuit for the GTO switch which, if turned on, requires 20 microseconds to turn off.

The output of gate UC6 is output through transistors (2N6660) as a trigger signal for the GTO switch. Dual outputs are provided for the GTO signal, one for the GTO switch itself and the other for display purposes on diagnostic equipment such as an oscilloscope.

The foregoing description of a preferred embodiment of the invention has been presented for purposes of illustration and description. It is not intended to be exhaustive or to limit the invention to the precise form disclosed, and obviously many modifications and variations are possible in light of the above teaching.

The present embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A charge regulation circuit comprising:
    an unregulated power supply having a first unregulated voltage value during a first charge cycle and a second unregulated voltage value during a second charge cycle,
    an inductor and capacitor connected in series with one another, wherein a charge voltage exists across the capacitor,
    a diode connected in parallel with said inductor and capacitor,
    a switch, and means for closing the switch at a first time for permitting said unregulated power supply to be connected to said capacitor through said inductor when the switch is in a closed position,
    means for opening said switch during the first charge cycle at a second time when said charge voltage reaches a first charge voltage such that the charge voltage across said capacitor will rise after said second time to a regulated final charge voltage, and means for opening said switch at a third time during the second charge cycle when said charge voltage reaches a second charge voltage such that the charge voltage across the capacitor will rise after said third time to said regulated final charge voltage, wherein the second charge voltage across said capacitor at said third time is equal to the product of the first charge voltage across said capacitor at said second time and the ratio of said first unregulated voltage value and said second unregulated voltage value.

2. A circuit as in claim 1 wherein said means for opening include an overcurrent shutdown circuit for providing fault protection.

3. A circuit as in claim 2 wherein said means for opening include a voltage check circuit for checking the voltages of said power supply and said capacitor.

4. A circuit as in claim 3 wherein said means for opening includes a charge stop circuit for stopping the charging of said capacitor when the voltage reaches the regulated final charge voltage.

5. A circuit as in claim 4 wherein said means for opening include a charge delay circuit for providing delays between said switch and the operation of said regulation circuit.

6. A circuit as in claim 5 wherein said means for opening include a charge time circuit for opening said switch.

7. A charge regulation circuit, comprising:
    an unregulated power supply producing an unregulated power which varies between first unregulated voltage value, E, and a second unregulated voltage value, E',
    an inductor and capacitor connected in series with one another, wherein a charge voltage exists across the capacitor,
    a diode connected in parallel with said inductor and capacitor,
    a switch, and means for closing the switch at a first time for permitting said unregulated power to be supplied to said capacitor through said inductor when the switch is in a closed position,
    means for opening said switch at a second time when said unregulated power has said first unregulated voltage value, at which second time the charge voltage across the capacitor has a first value, $V_1$ and for opening said switch at a third time when said unregulated power has said second unregulated voltage value, at which third time the charge voltage across the capacitor has a second value, $V_1'$, such that $V_1' = V_1 E/E'$.

8. A charge regulation circuit comprising:
    an unregulated power supply having a first unregulated voltage value during a first charge cycle and a second unregulated voltage value during a second charge cycle,
    an inductor and capacitor connected in series with one another,
    a diode connected in parallel with said inductor and capacitor, wherein a charge voltage exists across the capacitor,
    a switch, and means for closing the switch at a first time for permitting said unregulated power supply to be connected to said capacitor through said inductor when the switch is in a closed position,
    means for opening said switch at a second time during the first charge cycle when said charge voltage reaches a first charge voltage such that the charge voltage across said capacitor will rise after said second time to a regulated final charge voltage, and means for opening said switch at a third time during the second charge cycle when said charge voltage reaches a second charge voltage such that the charge voltage across the capacitor will rise after said third time to said regulated final charge voltage, wherein the second charge voltage across said capacitor at said third time is equal to the product of the first charge voltage across said capacitor at said second time and the ratio of said first unregulated voltage value and said second unregulated voltage value, said means for opening including:

an overcurrent shutdown circuit for providing fault protection, a voltage check circuit for checking the voltages of said power supply and said capacitor, a charge stop circuit for stopping the charging of said capacitor when the voltage reaches the regulated final charge voltage, a charge delay circuit for providing delays between said switch and the operation of said regulation circuit, and a charge time circuit for opening said switch.

* * * * *